United States Patent
Bernhardt et al.

(10) Patent No.: US 9,555,672 B2
(45) Date of Patent: Jan. 31, 2017

(54) PRESSURE CONTROL DEVICE FOR A TIRE INFLATING SYSTEM WITH A ROTARY FEEDTHROUGH, AND TIRE PRESSURE CHANGING METHOD

(75) Inventors: Dirk Bernhardt, Wunstorf (DE); Thomas Dieckmann, Pattensen (DE); Christian Wiehen, Burgwedel (DE); Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 484 days.

(21) Appl. No.: 14/119,327

(22) PCT Filed: Mar. 15, 2012

(86) PCT No.: PCT/EP2012/001151
§ 371 (c)(1),
(2), (4) Date: Nov. 21, 2013

(87) PCT Pub. No.: WO2012/175149
PCT Pub. Date: Dec. 27, 2012

(65) Prior Publication Data
US 2014/0076409 A1 Mar. 20, 2014

(30) Foreign Application Priority Data
Jun. 18, 2011 (DE) .................. 10 2011 104 760

(51) Int. Cl.
*B60C 23/00* (2006.01)
(52) U.S. Cl.
CPC ............. *B60C 23/00* (2013.01); *B60C 23/003* (2013.01); *Y10T 137/0379* (2015.04); *Y10T 137/36* (2015.04)

(58) Field of Classification Search
CPC ....... B60C 23/00; B60C 23/001; B60C 23/003
(Continued)

(56) References Cited

U.S. PATENT DOCUMENTS

| 4,705,090 A | 11/1987 | Bartos |
| 4,804,027 A | 2/1989 | Runels |

(Continued)

FOREIGN PATENT DOCUMENTS

| CN | 101863199 A | 10/2010 |
| CN | 102019820 A | 4/2011 |

(Continued)

*Primary Examiner* — Jason Bellinger
(74) *Attorney, Agent, or Firm* — Warner Norcross & Judd LLP

(57) ABSTRACT

A pressure control device for a vehicle tire inflating system is configured to receive compressed air via a ventilating inlet, activate at least one seal for sealing an air chamber between a stator and a rotor of a rotary feedthrough via a seal actuating outlet, and ventilate a tire at a ventilating outlet pressure via a ventilating outlet and the feedthrough. A control valve is pneumatically controllable by a control pressure, the ventilating outlet being ventilated at the outlet pressure by the control valve only when the control pressure is at least a defined minimum pressure. In response to pressure build-up at the ventilating inlet at least to the minimum pressure, the control pressure and the seal actuating pressure are built up for ventilating, but build-up of the control pressure is delayed with respect to the seal actuating pressure. Activation of a seal prior to ventilation of the ventilating outlet is possible without additional actuating channels.

18 Claims, 7 Drawing Sheets

(58) Field of Classification Search
USPC .............................. 152/415–417; 137/12, 224
See application file for complete search history.

(56) References Cited

U.S. PATENT DOCUMENTS

| | | |
|---|---|---|
| 6,439,044 B1 | 8/2002 | Tigges |
| 7,992,610 B2* | 8/2011 | Collet .................. B60C 23/003 |
| | | 152/417 |
| 8,783,314 B2* | 7/2014 | Tigges .................. B60C 23/003 |
| | | 152/416 |
| 2008/0309012 A1 | 12/2008 | Hystad |

FOREIGN PATENT DOCUMENTS

| | | |
|---|---|---|
| DE | 199 50 191 | 5/2001 |
| DE | 10 2007 027 147 | 12/2008 |
| JP | H02169310 A | 6/1990 |
| JP | H05246218 A | 9/1993 |
| JP | 20006069469 A | 3/2006 |
| JP | 2007125966 A | 5/2007 |

* cited by examiner

PRESSURE CONTROL DEVICE FOR A TIRE INFLATING SYSTEM WITH A ROTARY FEEDTHROUGH, AND TIRE PRESSURE CHANGING METHOD

FIELD OF THE INVENTION

The present invention generally relates to a pressure control device for a vehicle tire inflating system that comprises a rotary feedthrough having a stator and a rotor by which compressed air is guided through a wheel hub to a wheel fastened to the wheel hub. The present invention also relates to a tire pressure changing method.

BACKGROUND OF THE INVENTION

Tire inflating systems in motor vehicles render it possible to change the tire pressure of tires on wheels of the vehicle from inside the vehicle even when the vehicle is moving. As a consequence, the tire pressure can be adjusted such that the road resistance of the tires, the wear and tear on the tires and the drive energy necessary to drive the vehicle are minimized on any road surface and/or in any loaded state of the vehicle. As a consequence, the service life of the tires is increased and the fuel consumption of the vehicle is reduced. All in all, the use of a tire inflating system consequently reduces the running costs for the vehicle.

A tire pressure regulation system and/or a tire inflating system is disclosed in DE 199 50 191 C1, in which one, two or also several lines can be fed through the rotary feedthrough in the wheel hub. The rotary feedthrough comprises at least one chamber that is delimited by one annular body arranged on the stator side and by one annular body arranged on the rotor side in a concentric manner with respect to the axis of rotation of the wheel. The chamber is in particular an annular chamber.

The stator-side annular body and/or stator and the rotor-side annular body and/or rotor are spaced from one another by a movement gap. If compressed air is to be transferred from the stator to the rotor and as a consequence to the wheel, the movement gap must be sealed on both sides of the chamber. This sealed arrangement is achieved by seals and/or sealing rings that can be activated pneumatically and/or can be controlled by way of a control line. If the pressure in the tires is to be changed, the seal is initially activated by way of the control line. Then, in a second step, the pressure in the tires is changed by way of the rotary feedthrough. After venting the chamber by the rotary feedthrough, it is necessary to vent the control line in order to deactivate the seal, so that the seal does not suffer any unnecessary wear and tear as a result of friction of the rotor, which is rotating with respect to the stator and also with respect to the seal.

One disadvantage of the known tire pressure regulation system in accordance with DE 199 50 191 C1 is that, in addition to the line that is fed through the rotary feedthrough, an additional control line is fed to the wheel hub and/or to the rotary feedthrough, for which it is necessary to control an additional control pressure in order to switch the seal. The control and provision of a pressure of this type is generally achieved in a laborious manner by means of electromagnetically controlled valves.

A rotary feedthrough for a medium that can be fed through under pressure is disclosed in DE 10 2007 027 147 A1, in which this medium, in particular compressed air, is likewise transferred from a stator to a rotor. A seal is pressed against the rotor by means of the pressure of the compressed air that is fed through the rotary feedthrough from the stator, thus bridging a gap. As a consequence, the seal lies on the rotor in the case of compressed air being fed through the rotary feedthrough, whereas if compressed air is not fed through, the seal lies free. However, compressed air can escape through the gap between the stator and the rotor if the pressure of this compressed air is not sufficient to press a piston against a seal to such an extent that this seal reshapes and lies against the rotor. This can be the case for a short time period during the build-up and release of pressure.

SUMMARY OF THE INVENTION

Generally speaking, it is an object of the present invention to provide an improved, simplified device and a method for changing the tire pressure, in particular for commercial vehicles.

The pressure control device comprises a ventilating inlet that can be connected to a pressure supply device and/or central valve unit of the vehicle. The pressure supply device can provide compressed air at a pressure that is controlled, by way of example, by means of electromagnetic valves. Furthermore, the pressure control device comprises a ventilating outlet through which compressed air can be fed from the stator to the rotor by way of the rotary feedthrough. The pressure control device can consequently be disposed between the pressure supply device of the motor vehicle and the rotary feedthrough through the wheel hub. The pressure control device receives compressed air a ventilating inlet pressure by way of the ventilating inlet. The pressure control device inflates the tire with a ventilating outlet pressure by way of the ventilating outlet and further by way of the rotary feedthrough.

In addition, however, the pressure control device also provides a seal actuating pressure at a seal actuating outlet, wherein the pressure control device, by way of this seal actuating outlet, activates at least one seal by means of compressed air with the seal actuating pressure, and, as a consequence, seals an air chamber arranged between the stator and the rotor. The ventilation of the seal actuating outlet is likewise performed with compressed air that is supplied by way of the ventilating inlet. In particular, the pressure control device does not comprise an additional ventilating inlet; notably, it does not comprise a separate actuating inlet for controlling the seal actuating pressure.

Furthermore, the pressure control device comprises a switchover valve that can be pneumatically switched by means of a switching pressure, wherein the ventilating outlet is then only ventilated with the ventilating outlet pressure by means of this switchover valve if the switching pressure is at least as high as a predefined minimum switching pressure. If, however, the switching pressure is lower than the minimum switching pressure, the switchover valve assumes a blocked position, in which the ventilating outlet is prevented from being ventilated by the ventilating inlet.

The pressure control device is embodied such that, as the ventilating inlet is ventilated, the seal actuating outlet and a switching inlet of the switchover valve are also ventilated. If the ventilating inlet and/or the pressure control device with the ventilating inlet, the ventilating outlet and the seal actuating outlet is vented and the pressure in the tire is to be changed, the ventilating outlet must be ventilated. For this purpose, the ventilating inlet is ventilated, in particular by means of the pressure supply device.

The pressure control device is embodied such that, and/or comprises a compressed air guide and/or an arrangement of pressure ducts and pressure chambers such that, in response to a build-up of the ventilating inlet pressure at the previously ventilated ventilating inlet, a build-up of switching pressure as well as the seal actuating pressure occurs in order to ventilate the ventilating outlet. The switching pressure provides the activation of the seal. The seal actuating pressure switches the switchover valve if the switching pressure achieves the minimum switching pressure.

In particular, the build-up of the ventilating inlet pressure occurs at a pressure gradient with respect to time that is at least as great as a predefined minimum pressure gradient. Furthermore, the compressed air is guided such that the pressure build-up of the switching pressure to this minimum switching pressure is slower with respect to the build-up of pressure of the seal actuating pressure to this minimum switching pressure. Consequently, the seal is initially activated in response to compressed air being provided at the ventilating inlet and the switching valve is only switched in a delayed manner when the seal seals the air chamber with sufficient force between the stator and the rotor, so that subsequently compressed air is guided into the air chamber between the stator and the rotor and consequently through the rotary feedthrough to the tire. As a result, the seal already lies against the rotor with sufficient high pressure if the pressure duet comprising the air chamber through the rotary feedthrough is opened by means of the switchover valve.

After opening and/or positioning the switchover valve into the through-going position, compressed air is immediately and efficiently supplied to the tire by way of the rotary feedthrough. Consequently, it is possible to ventilate the ventilating outlet efficiently even if the ventilating inlet pressure has not achieved or has not yet achieved a maximum possible value for a ventilating inlet pressure.

In an embodiment of the present invention, the pressure control device is a unit having a housing that is provided with connectors, namely the ventilating inlet, the ventilating outlet, and the seal actuating outlet. Preferably, this housing does not comprise additional connectors. In particular, the pressure control device only comprises pneumatic components and does not comprise any electro-pneumatic components. Also, the pressure control device preferably does not comprise additional electrical devices, so that the pressure control device, by way of example, can be embodied as one block that simultaneously forms the housing, and into the block are integrated bore holes as pressure ducts for the purpose of guiding compressed air and also movable components as valves and/or parts of valves.

According to an embodiment of the present invention, the pressure control device comprises a narrowing of the cross section, in particular a restriction, and an air chamber arranged downstream of the restriction, and is connected to a switching inlet of the switchover valve. The restriction and air chamber together delay the build-up of the switching pressure. In particular, the build-up of the switching pressure is delayed with respect to the build-up of the seal actuating pressure. As a consequence, the switchover valve only switches from its blocking position into its through-going position and therefore compressed air only flows through the rotary feedthrough if the seal is activated and/or applied.

The narrowing of the cross section is an air feedthrough that can be embodied by way of example as a bore hole, which comprises a smaller cross section in comparison to bore holes that carry compressed air to the seal actuating outlet, so that per unit of time less compressed air can be guided through the narrowing of the cross section to the switching inlet of the switchover valve than to the seal actuating outlet. In addition, the air chamber ensures that a greater magnitude of air has to pass through the narrowing of the cross section before the minimum switching pressure is built-up.

The switchover valve preferably comprises a spring and assumes the blocking position by way of the force of the spring if the switching pressure is lower than that of the minimum switching pressure. The through-going position is achieved by means of the switching pressure against the force of the spring. The switchover valve is preferably a 2/2 directional-control valve, which can only assume the blocking position and the through-going position.

In accordance with another embodiment, the pressure control device comprises a non-return valve by way of which the ventilating outlet is vented to the ventilating inlet. As a consequence, it is possible to vent the ventilating outlet by way of this non-return valve venting direction, in particular in the case that the non-return valve is closed and/or the switchover valve inlet is vented to below the minimum switchover pressure. Any residual pressure that is possibly still present can be released at the ventilating outlet during the venting process even if the switchover valve is already in the blocking position. However, the non-return valve that is in the blocking position blocks the flow in an opposing direction and/or in the ventilating direction. The ventilating of the ventilating outlet and/or an increase in pressure at the ventilating outlet is therefore, preferably, only possible by way of the switchover valve, so that ventilation only occurs when the seal is applied.

In a further embodiment, the pressure control device comprises an additional non-return valve and a connection with a reduced cross section and/or restriction. The seal actuating outlet is ventilated by way of this additional non-return valve. On the other hand, the additional non-return valve blocks the flow in the venting direction. The seal actuating outlet is vented by way of the connection with the reduced cross section and/or restriction. The seal actuating outlet is consequently ventilated at most with a first volume flow by way of the additional non-return valve and vented by way of the connection with the reduced cross section and/or restriction at most with a second volume flow that is reduced in comparison to the first volume flow. As a result, the seal is applied rapidly but released slowly. Consequently, the seal is indeed first activated when the switchover valve is actuated. However, the seal is only deactivated slowly, whereas the ventilating outlet is in contrast vented rapidly, so that the ventilating outlet is vented before the seal is deactivated.

In a preferred embodiment of the invention, the additional non-return valve and the connection with the reduced cross section and/or restriction are embodied together as a one-way valve with a restrictor return, wherein the restriction is integrated into the non-return valve. In particular, the restriction is embodied by way of a bore hole in a valve piston of the one-way valve with a restrictor return.

In accordance with another embodiment of the invention, the pressure control device comprises a pressure reducer connected upstream of the ventilating outlet. The pressure reducer provides at the ventilating outlet compressed air with a ventilating outlet pressure that is reduced in comparison with the ventilating inlet pressure at the ventilating inlet. In particular, the ventilating outlet pressure is reduced in a predefined reduction ratio in comparison to the ventilating inlet pressure. As a consequence, during the ventilating and/or venting process, the seal is always applied with a sufficiently strong pressure even if ventilation is to take place with a comparatively low pressure.

In another embodiment, the pressure control device is integrated into the rotary feedthrough. The rotary feedthrough consequently comprises the stator, the rotor and the pressure control device. Therefore, only one compressed air line to the wheel hub having the rotary feedthrough is required for applying the seal and for inflating and/or deflating the tire and, where necessary, for controlling this inflation and/or deflation process at the wheel to the wheel hub and/or to the rotary feedthrough. In particular, this leads to short conducting paths from the pressure control device to the seal and to the line, which is fed through the rotary feedthrough.

In an alternative embodiment, the pressure control device is arranged to one side of the rotary feedthrough and/or to one side of the hub on the motor vehicle.

The tire inflating system according to embodiments of the present invention is provided for a motor vehicle that comprises the tire that can be rotated together with the rotor. The tire inflating system comprises the rotary feedthrough having the stator and the rotor. Moreover, the tire inflating system comprises the pressure control device, which is either arranged separately from the rotary feedthrough or is integrated into the rotary feedthrough.

The tire inflating system preferably comprises a wheel valve and/or a tire pressure control valve, which is arranged on a wheel that comprises the tire and/or is connected to the rotor, so that the valve can rotate together with the rotor and the tire. The wheel valve controls the inflation and deflation of the tire and, consequently, the tire pressure, in that at least for the purpose of inflation, preferably however also for the purpose of deflation, the wheel valve opens a compressed air path from the ventilating outlet of the pressure control device to the tire and alternatively closes the path and consequently holds the air in the tire if the tire pressure is not to be changed.

In accordance with another embodiment of the invention, a tire inflating valve is disposed between the wheel valve and the tire. This arrangement permanently holds open a connection of the wheel valve to the tire. A compressed air line that leads from the tire inflating valve to the wheel valve is preferably screwed on to the tire inflating valve such that the tire inflating valve is prevented from assuming its blocking position. In an alternative embodiment, the tire inflating valve is omitted.

The wheel valve is preferably embodied and arranged such that it is actuated pneumatically by its wheel valve inlet pressure that is prevailing at the wheel valve inlet. The wheel valve inlet is connected to the rotary feedthrough, whereas a wheel valve outlet leads to the tire and/or to the tire inflating valve that is connected upstream of the tire. Additional control lines are therefore not required through the wheel hub and/or through the rotary feedthrough. The rotary feedthrough is consequently preferably embodied as a single duct rotary feedthrough that comprises only one air chamber between the stator and the rotor, which air chamber can be sealed on both sides in each case by a seal.

In order to implement the functions of ventilating, venting and maintaining pressure by means of the wheel valve, the control connector of the wheel valve is connected to the wheel valve inlet, wherein the wheel valve assumes a through-going position in accordance with a preferred embodiment if the pressure at the wheel valve inlet is at least as high as a predefined minimum pressure and the wheel valve assumes a blocking position if the pressure at the wheel valve inlet is lower than this minimum pressure or another minimum pressure. The minimum pressure can be, for example 1 bar. In order to change the tire pressure to a magnitude that is at least as high as the minimum pressure, this new tire pressure is therefore provided at the ventilating outlet of the pressure control device and also at the wheel valve inlet. The wheel valve thereupon opens so that the tire pressure likewise adjusts to the ventilating outlet pressure. If the desired pressure is achieved, the pressure control device rapidly vents the ventilating outlet to the ventilating inlet so that the pressure at the wheel valve inlet and, consequently, also the pressure at the control connector of the wheel valve drops to below the minimum pressure, and the wheel valve switches to its blocking position so that, subsequently, the adjusted pressure is maintained in the tire.

The wheel valve is preferably embodied as a 2/2 directional-control valve that comprises only one switching position for connecting the wheel valve inlet to the wheel valve outlet and one switching position for blocking the wheel valve outlet with respect to the wheel valve inlet. The wheel valve assumes the blocking position by way of the force of a spring in the case of an actuating pressure that lies below the minimum pressure.

In accordance with a preferred embodiment of the invention, the wheel valve outlet is embodied in a restricted manner and/or a narrowing of the cross section and/or restriction for limiting the volume flow between the wheel valve outlet and the tire and/or tire inflating valve is connected downstream of the heel valve outlet. As a consequence, when venting the ventilating outlet of the pressure control device, the pressure at the wheel valve inlet and, consequently, also at the control connector of the wheel valve, drops rapidly to below the minimum pressure and causes the wheel valve to be blocked, although compressed air flows back from the tire to the wheel valve. The extent to which this compressed air can flow back is limited due to the restricted wheel valve outlet, so that the pressure in the tire is only insignificantly reduced if the ventilating outlet is vented before the wheel valve closes.

In another embodiment, the rotary feedthrough is structurally consolidated into one unit with a wheel bearing, which supports the wheel that comprises the tire. In this manner, a space-saving and cost-effective arrangement of the rotary feedthrough is rendered possible. Alternatively or additionally, the rotary feedthrough is structurally consolidated into one unit with an ABS (Anti-lock Brake System)-speed sensor system, which is allocated to this wheel. This also provides advantages with respect to a space-saving and cost-effective arrangement of the rotary feedthrough.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which.

DETAILED DESCRIPTION OF THE PREFERRED EMBODIMENTS

Figure 1:
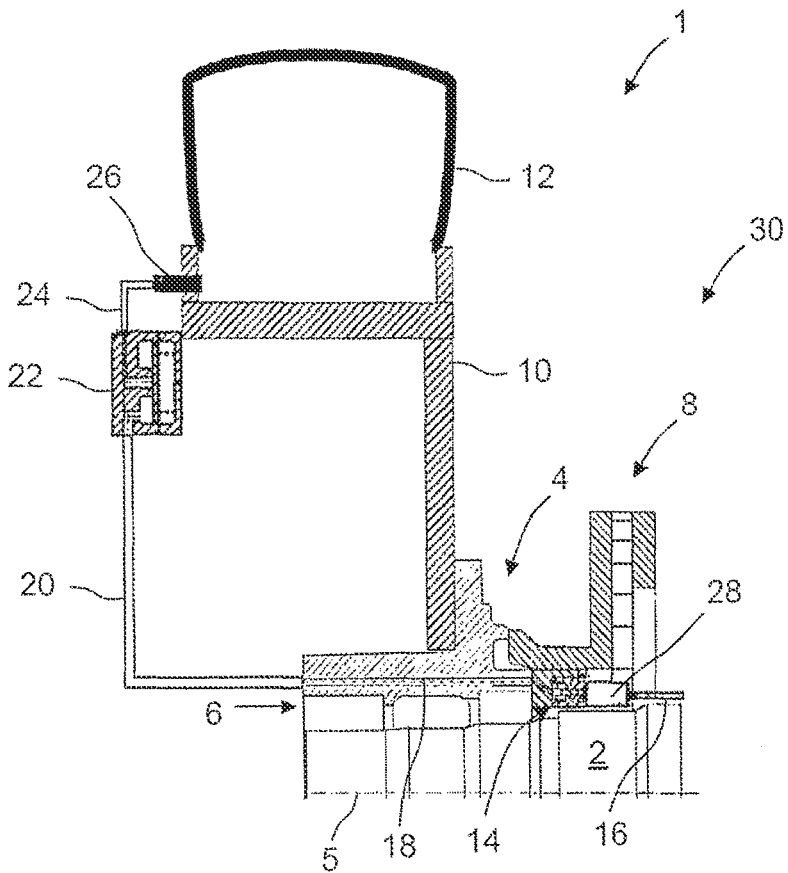
FIG. 1 is a cross-sectional view of part of a wheel of a motor vehicle having a tire inflating system with a pressure control device and a rotary feedthrough in accordance with an embodiment of the present invention.

FIG. 1 illustrates parts of a wheel 1 of a motor vehicle, wherein the wheel 1 is mounted on an axle 2 by means of a hub 4 such that it can rotate about an axis of rotation 5, which is represented by a dot-dashed line. For this purpose, the hub 4 comprises a wheel bearing 6. In addition, a brake system 8, by way of example a disc brake, is arranged on the hub 4.

The wheel 1 comprises a rim 10 and a tire 12. The rim 10 is, by way of example, fastened to the huh 4 by means of a plurality of screws. The tire 12 is supported by the rim 10.

A rotary feedthrough 14 for connecting a compressed air duct 16 to a compressed air duct 18 is integrated into the hub 4. The compressed air duct 16 is connected to a central valve unit, and is arranged to one side of the wheel 1, by way of which central valve unit compressed air is drawn in at a controlled pressure or also the compressed air duct 16 can be vented.

The compressed air duct 18 can be connected in series to the tire 12 and/or to the compressed air in the tire 12 by way of a compressed air duet 20, a wheel valve 22 that is embodied as a tire pressure control valve, a compressed air duct 24 and a tire inflating valve 26. The tire inflating valve 26 assumes a through-going position. In particular, the pressure in the tire 12 can be reduced or increased by changing the pressure in the compressed air duct 16. The compressed air ducts 18 and 20 are both working ducts that guide compressed air to the tire 12 and/or guide compressed air away from the tire 12, and they are also control ducts for the wheel valve 22. It is therefore sufficient for the rotary feedthrough 14 to be embodied in a single duct.

A pressure control device 28 in accordance with an embodiment of the invention is connected upstream of the rotary feedthrough 14. The pressure control device, in dependence upon the pressure in the compressed air duct 16, either blocks a connection from the compressed air duct 16 to the rotary feedthrough 14 and, consequently, to the compressed air duct 18, or enables the compressed air duct 18 to be ventilated or vented by way of the rotary feedthrough 14 and the pressure control device 28. Furthermore, the pressure control device 28 controls seals in order to seal the rotary feedthrough 14—likewise in dependence upon the pressure in the compressed air duct 16. The compressed air duct 16 consequently functions as a working line and, in addition, as a control line for the pressure control device 28 and for the wheel valve 22.

The foregoing functions are therefore achieved by way of the compressed air duct 16, which is guided as a single compressed air duct to the wheel 4. As a consequence, it should be appreciated that the invention renders it possible to achieve a technically simple and cost-effective regulation of the tire pressure. A tire inflating system 30 having the pressure control device 28, the rotary feedthrough 14, the wheel valve 22, the tire inflating valve 26 and the compressed air ducts 16, 18, 20 and 24 is therefore provided optimized in particular for commercial vehicles. The simple embodiment having a single duct design of the rotary feedthrough 14 and having the single duct connection by way of the compressed air duct 16 is therefore possible, since, on the one hand, the air pressure in the tire 12 must not drop to below 1 bar of over-pressure with respect to the atmosphere, and consequently sufficient over-pressure can be provided in order to perform the pneumatically controlled switching in the wheel valve 22 and in the pressure control device 28, and on the other hand, the tire pressure in the ease of road-going vehicles must only be changed in a small pressure interval, in particular of less than 2 bar, preferably less than 1 bar.

Figure 2:
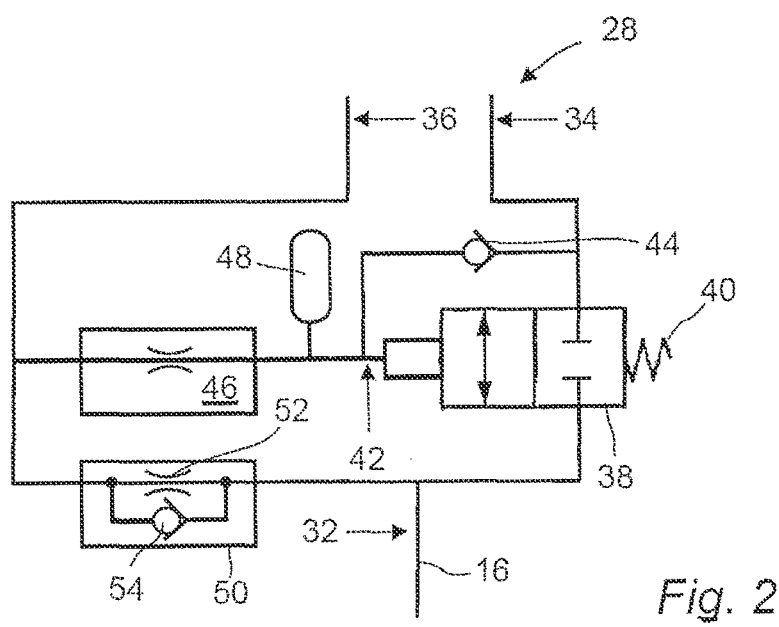
FIG. 2 is a schematic diagram of the pressure control device of the exemplar), embodiment in FIG. 1 having a one-way valve with a restrictor return.

FIG. 2 is a schematic diagram of the pressure control device 28 of the exemplary embodiment shown in FIG. 1. The pressure control device 28 comprises a ventilation inlet 32 that is connected to the compressed air duct 16. Furthermore, the pressure control device 28 comprises a ventilating outlet 34 and a seal actuating outlet 36. The ventilating outlet 34 can be connected to the rotary feedthrough 14 such that the outlet can be connected to the compressed air duct 18 by way of the duct of the rotary feedthrough 14. The seal actuating outlet 36 can, however, be connected to the rotary feedthrough 14 such that the connection between the ventilating outlet 34 and the compressed air duct 18 in the rotary feedthrough 14 can be sealed by means of a seal actuating outlet pressure provided at the seal actuating outlet. For this purpose, seals are actuated by means of the seal actuating outlet pressure.

The pressure control device 28 comprises pneumatically controllable components. In particular, the pressure control device 28 comprises a switchover valve 38 embodied as a 2/2 directional-control valve that can be switched against the force of the spring 40 by means of a switching pressure at a switching inlet 42. In its normal position, the switchover valve 38 blocks the ventilating outlet 34 with respect to the ventilating inlet 32. When the pressure at the switching inlet 42 is above a minimum pressure, the switchover valve 38 switches against the force of the spring 40 into its through-going position, in which the ventilating inlet 32 and the ventilating outlet 34 are connected to one another in a pneumatic manner by way of the switchover valve 38. It is possible to vent the ventilation outlet 34 to the ventilating inlet 32, in particular in the blocking position of the switchover valve 38, by way of a non-return valve 44.

The switching inlet 42 of the switchover valve 38 is connected to the ventilating inlet 32 by way of a restriction 46. A pressure storage container 48 is arranged between the restriction 46 and the switching inlet 42. The pressure storage container increases the necessary amount of air that must flow through the restriction 46 before the switching pressure changes at the switching inlet 42. The restriction 46 and the pressure storage container 48 operate in combination such that, in response to a pressure change at the ventilating inlet 32, a ventilating inlet pressure that is present at this site is adjusted in a delayed manner at the switching inlet 42. This serves the purpose of only ventilating the ventilating outlet 34 if sufficient time has passed for applying the seals in the rotary feedthrough 14.

The seals are activated and/or applied comparatively rapidly, since the ventilating inlet 32 and the seal actuating outlet 36 are connected to one another by means of a one-way valve with a restrictor return 50, wherein the seal actuating outlet 36 can not only be ventilated by way of a restriction 52 in the one-way valve with a restrictor return 50, but can be ventilated primarily by way of an additional non-return valve 54 in the one-way valve with a restrictor return 50. In contrast, the seal actuating outlet 36 is vented by way of the one-way valve with a restrictor return 50 only by way of the restriction 52, because the non-return valve 54 blocks in the venting direction. As a consequence, the seals in the rotary feedthrough 14 are deactivated in a delayed and/or gradual manner, in particular proportional with respect to venting the ventilating outlet 34 to the ventilating inlet 32.

Figure 3:
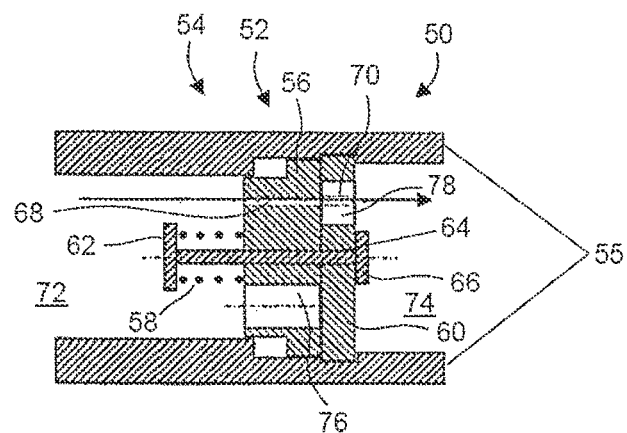
FIG. 3 is a cross-sectional view of the one-way valve with a restrictor return in FIG. 2 in the case of a closed valve.

FIG. 3 is a cross-sectional view showing structural details of the one-way valve with a restrictor return 50 in accordance with FIG. 2 in the case of a closed valve. The one-way valve with a restrictor return 50 comprises a housing 55 and/or a valve block, in which a shut-off body 56 is pushed against a valve seating 60 with the force of a spring 58. This housing 55 and/or this valve block can be a common housing or a common valve block for several or all parts of the pressure control device 28, and, in one embodiment, can be part of the wheel bearing 6. The spring 58 presses against a counter bearing 62 that is fixed relative to the valve seating 60 by means of a rod 64 and a counter bearing 66. The shut-off body 56 and the valve seating 60 comprise bore holes 68 and 70 that correspond to one another and form a restriction 52. In particular, compressed air can flow in the venting direction from an outflow side 72 to an inflow side 74 of the one-way valve with a restrictor return 50 by way of the bore holes 68 and 70 and/or by way of the restriction 52, irrespective of the position of the shut-off body 56.

Both the shut-off body 56 and also the valve seating 60 comprise, in each case, at least one bore hole 76 and/or 78 having an enlarged cross section with respect to the bore hole 68 and/or 70. However, in contrast to the bore holes 68 and 70, the bore holes 76 and 78 are not arranged in a manner where they correspond to one another. In the closed state of the non-return valve 54 and/or when the shut-off body 56 is lying against the valve seating 60, the bore holes 76 and 78 are therefore blocked with respect to one another, so that air cannot flow through the bore holes 76 and 78 from the outflow side 72 to the inflow side 74 of the one-way valve with a restrictor return 50.

Figure 4:
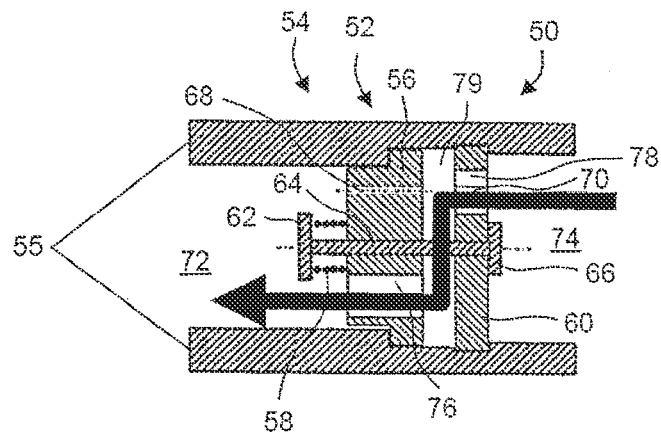
FIG. 4 is a cross-sectional view of the one-way valve with a restrictor return shown in FIGS. 2 and 3 in the case of an opened valve.

FIG. 4 is a cross-sectional view of the one-way valve with a restrictor return 50 shown in FIGS. 2 and 3 in the case of an opened non-return valve 54. This opened position is achieved if an over-pressure on the inflow side 74, in contrast to the outflow side 72, is of sufficient magnitude that compressed air that flows through the bore hole 78 pushes the shut-off body 56 against the force of the spring 58 in an axial manner and, as a consequence, opens a pressure chamber 79 that connects the bore holes 76 and 78 to one another so that compressed air can flow from the inflow side 74 through the bore hole 78, through the pressure chamber 79 and through the bore hole 76 to the outflow side 72 of the one-way valve with a restrictor return 50. The spring 58 closes the non-return valve 54 as soon as pressure equalization between the sides 72 and 74 of the one-way valve with a restrictor return 50 has been performed, so that the arrangement that is illustrated in FIG. 3 is achieved.

Figure 5:
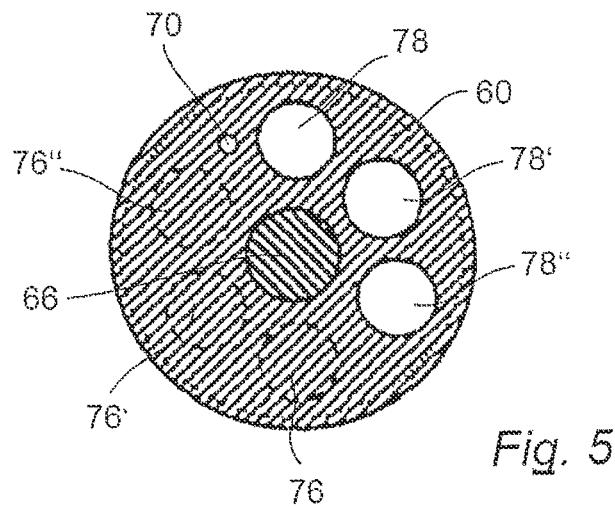
FIG. 5 is a front view of a valve seating of the one-way valve with a restrictor return in accordance with FIGS. 2 to 4.

The valve seating 60 together with the counter bearing 66 arranged centrally in front of it is illustrated in FIG. 5 in a view in the ventilating direction and/or from the inflow side 74 in the direction towards the outflow side 72 of the one-way valve with a restrictor return 50. The valve seating 60 comprises, in addition to the bore hole 78, two additional bore holes 78' and 78" that are identical to the bore hole 78. The shut-off body 56 is visible through these bore holes 78, 78' and 78". This shut-off body 56 comprises, as is illustrated by a dot-dashed line, the bore hole 76 and additional bore holes 76' and 76," which are identical to the bore hole 76 and are all arranged offset to each of the bore holes 78, 78' and 78" in the valve seating 60, so that, when the shut-off body 56 is lying against the valve seating 60, air does not flow through the bore holes 76, 76', 76", 78, 78' and 78".

Figure 6:
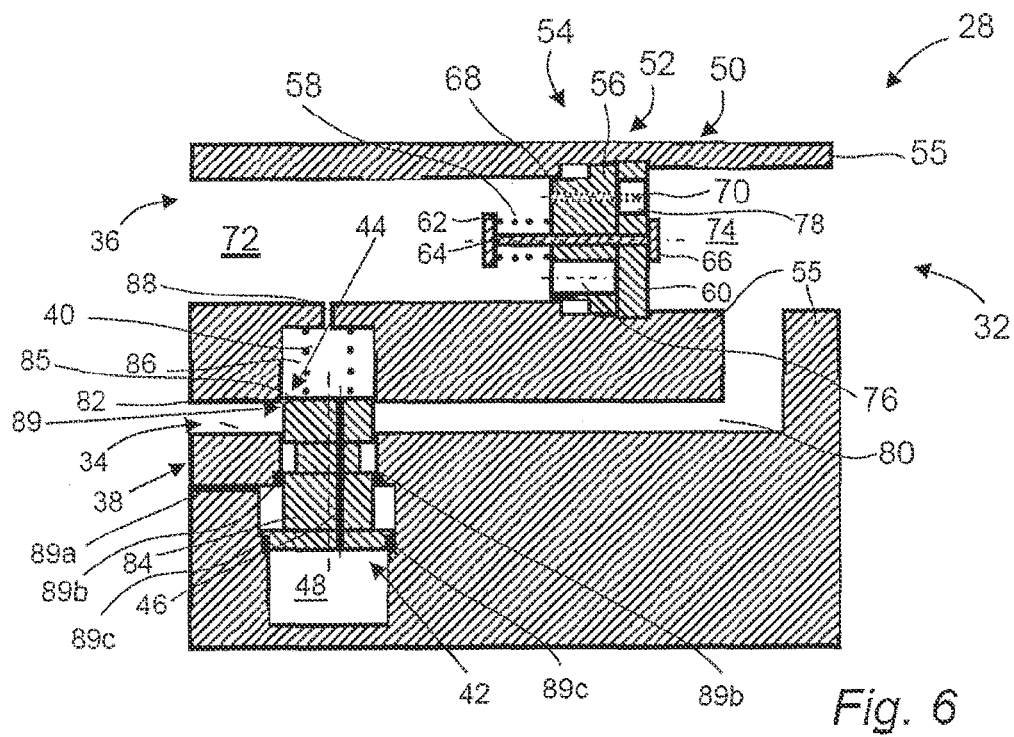
FIG. 6 is a first cross-sectional view of the pressure control device in accordance with FIGS. 1 and 2.

FIG. 6 is a first cross-sectional view of the pressure control device 28 in accordance with FIGS. 1 and 2. The pressure control device 28 comprises the one-way valve with a restrictor return 50 in accordance with FIG. 2 in a structural design in accordance with FIGS. 3, 4 and 5, wherein FIG. 6 illustrates the closed position of the non-return valve 54 in accordance with FIG. 3. A compressed air line 80 that is consequently connected to the ventilating inlet 32 branches off on the inflow side 74 of the one-way valve with a restrictor return 50. The compressed air line leads to the switchover valve 38 that, in the illustrated blocking state, separates the compressed air line 80 from a compressed air line 82 that is connected to the ventilating outlet 34. In particular, a shut-off body 84 separates the compressed air line 82 from the compressed air line 80. This shut-off body 84 is held in its position by way of the force of the spring 40 by way of a separating disc, in particular a rubber disc, or a sealing disc 85 that is arranged between the spring 40 and the shut-off valve 84.

The non-return valve 44, the restriction 46 and the pressure storage container 48 are structurally integrated into the embodiment of the switchover valve 38. The restriction 46 is achieved by way of a bore hole in the shut-off valve 84, which bore hole connects the pressure storage container 48 to a chamber 86 in which the spring 40 is arranged. The chamber 86 is, in turn, connected to the outflow side 72 of the one-way valve with a restrictor return 50 and/or to the seal actuating outlet 36 by way of a bore hole 88.

The non-return valve 44 is achieved by way of a groove 89 in the shut-off valve 84 and the sealing disc 85. Compressed air can flow from the seal actuating outlet 36 to the sealing disc 85 by way of the groove 89 and the sealing disc 85 is pushed against the force of the spring 40 such that the compressed air can escape through a gap between the shut-off body 84 and the sealing disc 85 and continues onwards through an opening in the sealing disc 85 to the chamber 86.

An equalization of pressure in order to be able to switch the switchover valve 38 is provided by way of a bore hole 89a, wherein the compressed air line 80 and the pressure storage container 48 are shut off by means of sealing rings 89b and 89c with respect to this bore hole 89a. The bore hole 89 connects a region of the switchover valve 38 that is delimited by the sealing rings 89b and 89c to the surrounding area and/or to the atmosphere and is consequently influenced by atmospheric air pressure; a part of the shut-off body 56 moves in this region.

In contrast to the illustration in accordance with FIG. 6, instead of the bore hole 88 that ultimately connects the switching inlet 42 of the switchover valve 38 to the seal actuating outlet 36, it is possible to provide an alternative bore hole and/or compressed air line between the chamber 86 and the inflow side 74 of the one-way valve with a restrictor return 50 and/or the compressed air line 80 and/or the ventilating inlet 32.

Figure 7:
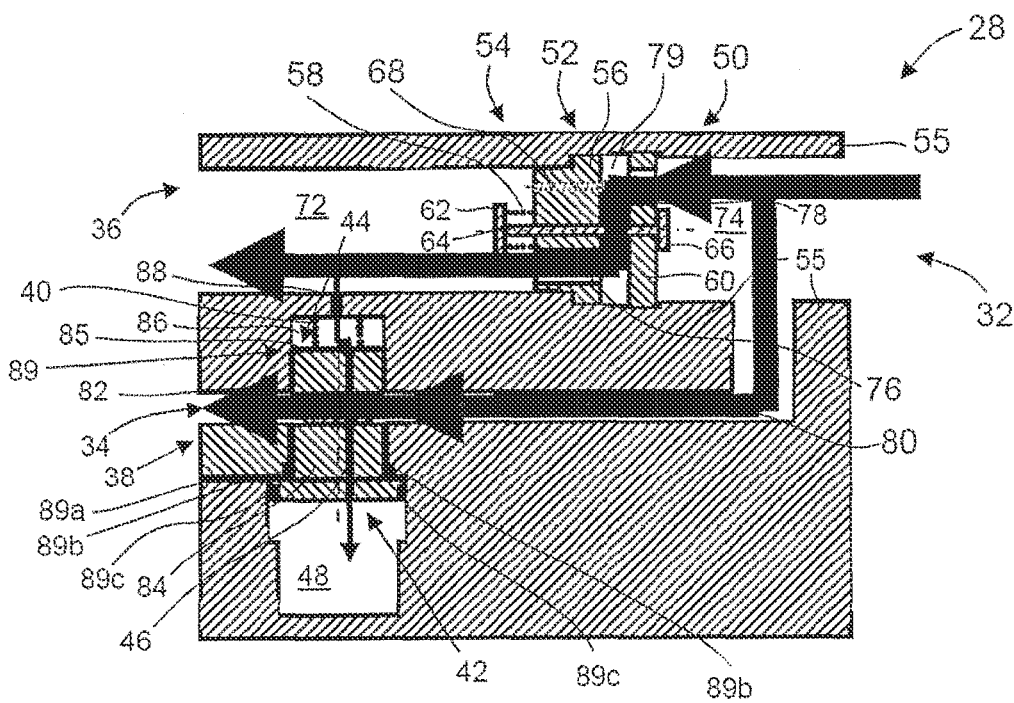
FIG. 7 is a second cross-sectional view of the pressure control device in accordance with FIGS. 1 and 2.

FIG. 7 shows the pressure control device 28 during the build-up of pressure. In contrast to FIG. 6, both the non-return valve 54 in the one-way valve with a restrictor return 50 and also the switchover valve 38 are illustrated, in each case, in the opened position—in other words, the through-going position. These valve positions are assumed if the ventilating inlet 32 and the seal actuating outlet 36 are ventilated, wherein the pressure in the pressure chamber 79 must be at least as high as to hold the non-return valve 54 in its open position against the force of the spring 58 and the pressure from the outflow side 72 of the one-way valve with a restrictor return 50. The switching pressure in the pressure storage container 48, and consequently at the switching inlet 42 of the switchover valve 38, is at least as high as the minimum switching pressure that is required for switching the switchover valve 38, so that the switchover valve 38 assumes its open position. The ventilating outlet 34 is also ventilated in this switching position.

If the pressure in the tire is to be changed, compressed air is provided at the ventilating inlet 32, and the compressed air is distributed in accordance with the illustrated arrows. In particular, the non-return valve 54 in the one-way valve with restrictor return 50 initially opens, so that the seal actuating outlet 36 is rapidly ventilated and seals can be applied in the rotary feedthrough 14. In addition, compressed air flows slowly through the bore hole 88 into the chamber 86 and onwards through the bore hole and/or through the restriction 46 into the chamber and/or the pressure storage container 48. In the pressure storage container 48, the pressure as the switching pressure for the switchover valve 38 only increases slowly in comparison to the seal actuating outlet pressure at the seal actuating outlet 36. However, if the switching pressure has achieved a minimum switching pressure, the switchover valve 38 switches against the force of the spring 40 into its through-going position, so that the ventilating outlet 34 is ventilated by way of the switchover valve 38 and, subsequently, the pressure in the tire 12 can be increased or reduced.

Figure 8:
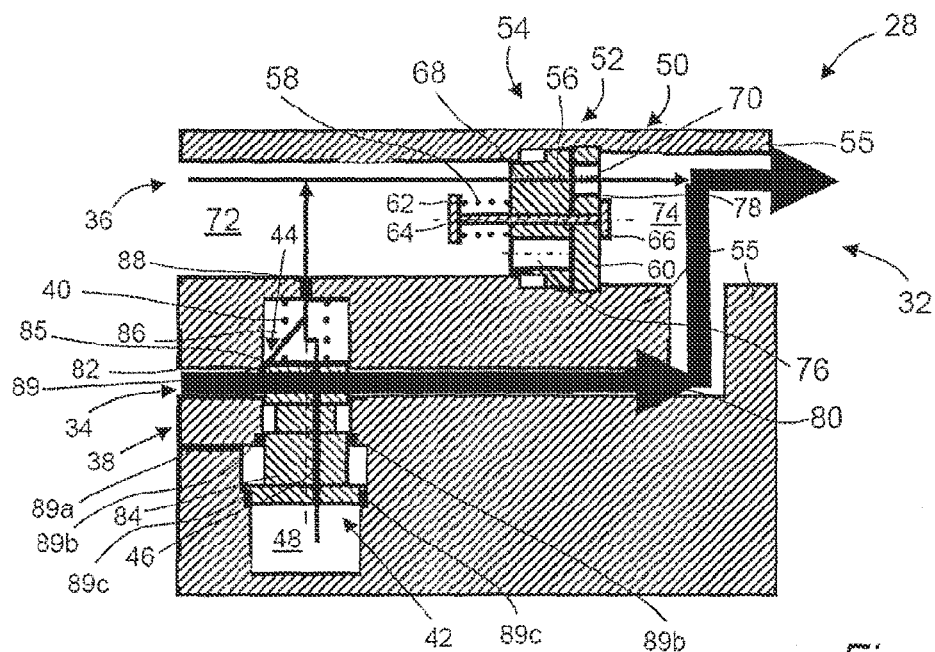
FIG. 8 is a third cross-sectional view of the pressure control device in accordance with FIGS. 1 and 2.

FIG. 8 shows the pressure control unit 28 during the build-up of pressure. The valves 44 and 54 are in the switching positions in accordance with FIG. 6. However, in addition, FIG. 8 includes arrows that indicate how, in the event of the ventilating inlet 32 being vented, compressed air flows back to this ventilating inlet 32. In particular, a drop in pressure at the ventilating inlet 32 leads to the non-return valve 54 in the one-way valve with a restrictor return 50 being blocked, so that the seal actuating outlet 36 is subsequently vented only through the bore holes 68 and 70 and, consequently, in a restricted manner. In contrast, the ventilating outlet. 34 is rapidly vented with respect thereto by way of the switchover valve 38 to the ventilating inlet 32. Only at a later point in time, if in general it can be presumed that the ventilating outlet 34 is completely vented, has the control pressure at the switching inlet 42 been reduced sufficiently by way of the restricted flow of compressed air through the restriction 46 and the bore hole 88 and, in this ease, through the restriction 52 in the one-way valve with a restrictor return 50, to the extent that the switchover valve 38 assumes its blocking position with the force of the spring 40. The switching positions of the valves 44 and 54 correspond to the positions that are illustrated subsequently in FIG. 6.

An over-pressure that is possibly still present at the ventilating outlet 34 can be discharged when the switchover valve 38 is in the blocking position through the non-return valve 44 and/or through the groove 89, the chamber 86 and the bore hole 88 to the seal actuating outlet 36 and/or to the ventilating inlet 32.

Figure 9:
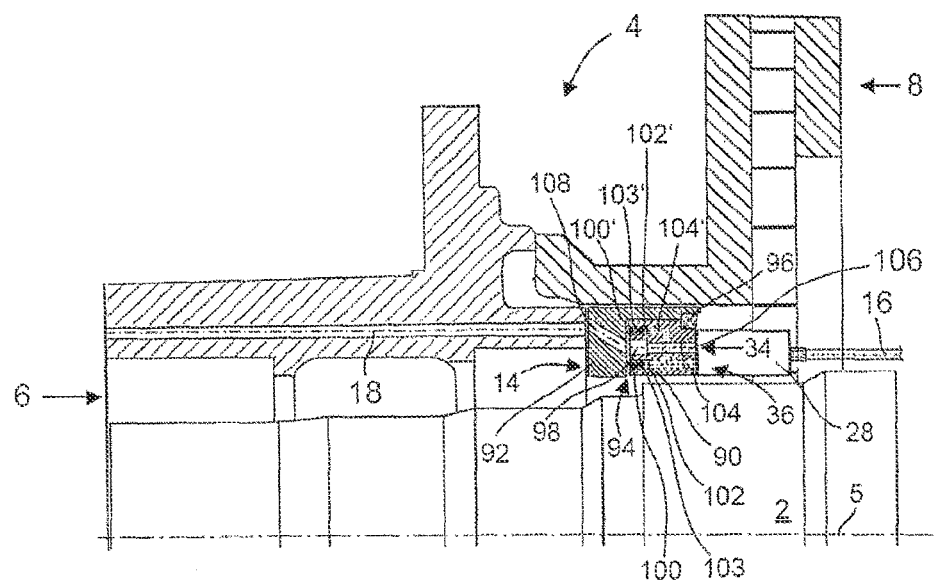
FIG. 9 is an enlarged view of the rotary feedthrough and pressure control device shown in FIG. 1.

FIG. 9 is an enlarged view of the rotary feedthrough 14 shown in FIG. 1, which is described in greater detail hereinafter.

The rotary feedthrough 14 comprises a stator 90 and a rotor 92. The stator 90 and the rotor 92 are spaced from one another by way of a gap 94, so that the rotor 92 can rotate in a contactless manner with respect to the stator 90. The axis of rotation for the rotor 92 is the axis of rotation 5 of the axle 2.

The gap 94 is sealed at an exterior edge by way of a dirt-repellent seal 96 that prevents dirt from penetrating into this gap 94. The stator 90 comprises a groove that is arranged in a concentric manner about the axis of rotation 5 and/or a concentric annular gap as an air chamber 98. The gap 94 can be sealed on both sides of the air chamber 98 by means of seals 100 and 100'. The seals are arranged in a concentric manner about the axis of rotation of the axle 2 and are mounted in an axially displaceable manner in sealing ring grooves 102 and 102' that are arranged concentrically about the axis of rotation 5. The sealing ring grooves 102 and 102' are sealed starting from the gap 94 behind the seals 100 and 100' by means of O-rings 103 and 103' that are arranged concentrically about the axis of rotation 5 in these sealing ring grooves 102 and 102'. Furthermore, control lines 104 and 104' issue downstream of the sealing ring grooves 102 and 102' into the sealing ring groove 102 and 102', respectively, which are mutually connected to the seal actuating outlet 36 of the pressure control device 28. The ventilating outlet 34 of the pressure control device 28 is connected to the air chamber 98 by way of a working line 106. A working line 108 delimits the gap 94 on the rotor side corresponding to the air chamber 98. The working line issues into the compressed air duct 18, wherein a transfer region between the working line 108 and the compressed air duct 18 is understood to be sealed with respect to the surrounding area.

As the pressure influences the seal actuating outlet 36, compressed air presses against the O-rings 103 and 103', which, in turn, press against the seals 100 and 100', which press against the rotor 92, thus bridging the gap 94. As a consequence, by means of the working lines 106 and 108 and by means of the air chamber 98 that is sealed with respect to the surroundings, a single duct rotary feedthrough from the ventilating outlet 34 to the compressed air duet 18 is provided, by way of which the tire can be inflated or deflated.

As the seal actuating outlet 36 is vented, the seals 100 and 100' move back into the sealing ring groove 102 and 102', respectively, and the gap 94 is open again, so that the seals 100 and 100' are protected from wear and tear as a result of friction that otherwise occurs against the rotor 92. The displacement of the seals 100 and 100' in order to open the gap 94 can, where necessary, be supported by way of springs or other return elements.

Figure 10:
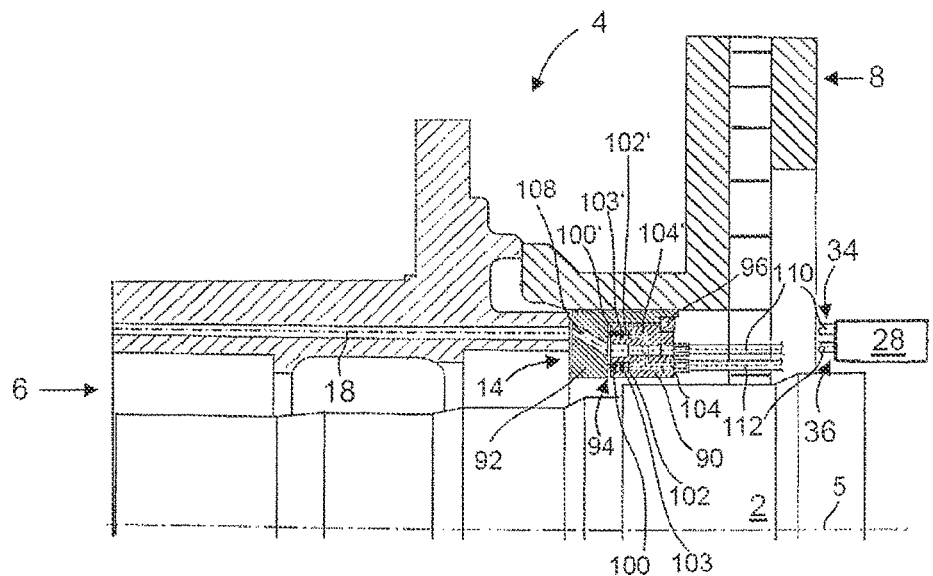
FIG. 10 shows a different arrangement of the pressure control device with respect to the embodiment shown in FIG. 9.

FIG. 10 shows the parts that are illustrated in FIG. 9, however, in this case, the pressure control device 28 is not, as illustrated in FIG. 9, directly mounted at the rotary feedthrough 14 and/or structurally formed as one unit with the stator 90 of the rotary feedthrough 14, but, rather, is arranged to one side of the huh 4. The ventilating outlet 34 and the seal actuating outlet 36 of the pressure control device 28 are therefore not directly connected to the working line 106 and/or to the control line 104, but, rather, a respective pneumatic connection is provided by way of a compressed air line 110 and/or 112. Nevertheless, the compressed air duct 16 must be fed from the central valve unit to the pressure control device 28. The pressure control device 28 can therefore be arranged advantageously to one side of this central valve unit and in the proximity of the wheel 1 that comprises the axle 2, in particular if the construction of the hub 4 does not allow the pressure control device 28 to be integrated into the hub 4 and/or into the wheel bearing 6.

Figure 11:
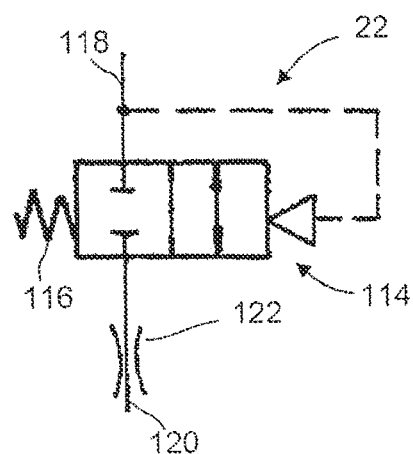
FIG. 11 is a schematic diagram of the wheel valve in the compressed air system in accordance with FIG. 1.

FIG. 11 is a schematic diagram of the wheel valve 22 shown in FIG. 1 in the tire inflating system 30. The wheel valve 22 is embodied as a 2/2 directional-control valve having a pneumatic actuating inlet 114 and a spring 116. The wheel valve 22 further comprises a wheel valve inlet 118 and a wheel valve outlet 120. The wheel valve inlet 118 is connected to the actuating inlet 114. When the wheel valve inlet 118 is in the vented state, the wheel valve 22 assumes, with the force of the spring 116, a blocking position of the wheel valve outlet 120 with respect to the wheel valve inlet 118. If, on the other hand, the pressure at the wheel valve inlet 118, and, consequently, also the pressure at the actuating inlet 114, achieves or exceeds a structurally predefined minimum pressure, the wheel valve 22 assumes a through-going position from the wheel valve inlet 118 to the wheel valve outlet 120. A restriction 122 is connected upstream or downstream of the wheel valve outlet 120, so that the pressure at the wheel valve inlet 118 can be reduced to below the predefined minimum pressure in order to block the wheel valve 22, without air that is flowing back from the tire 12 by way of the wheel valve outlet 120 and the wheel valve 22 preventing this from taking place.

Figure 12:
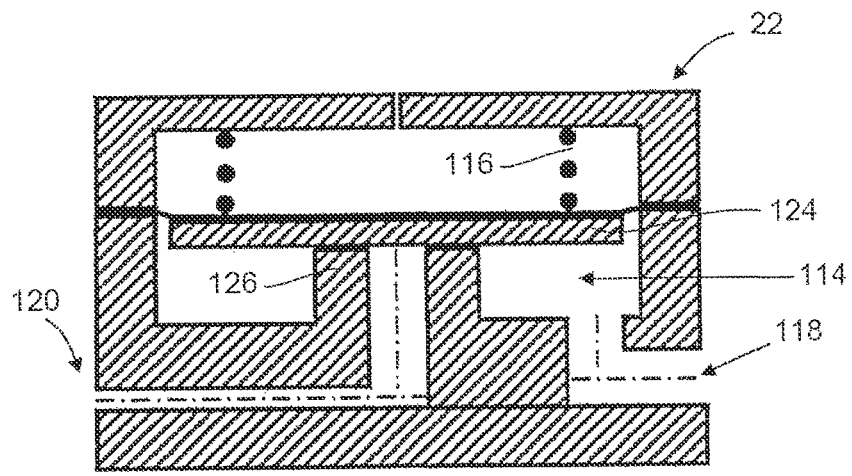
FIG. 12 is a first cross-sectional view of the wheel valve in accordance with FIG. 11.
Figure 13:
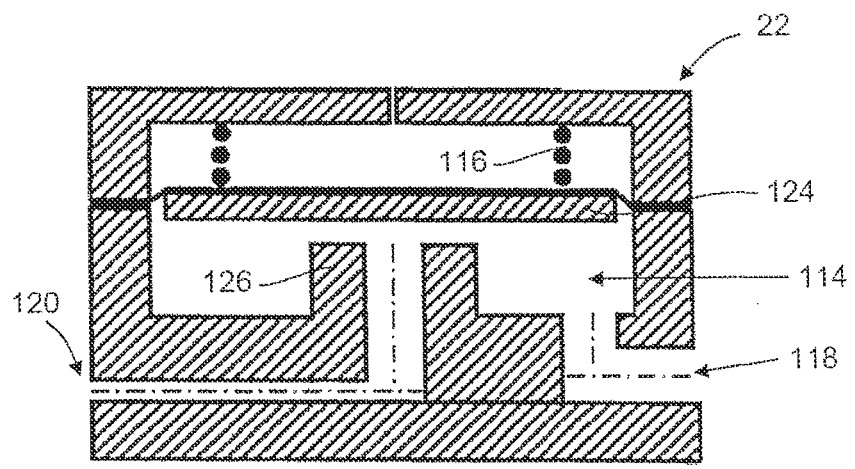
FIG. 13 is a second cross-sectional view of the wheel valve in accordance with FIG. 11.

FIGS. 12 and 13 show a first and/or second cross-sectional view of the wheel valve 22 in accordance with FIG. 11, wherein FIG. 12 illustrates the wheel valve 22 in its blocking position, and FIG. 13 illustrates the wheel valve 22 in its through-going position.

The wheel valve 22 is embodied such that the wheel valve inlet 118 simultaneously forms the actuating inlet 114. The restriction 122 is formed by way of a bore hole that forms the wheel valve outlet 120 and/or leads to the wheel valve outlet 120, which bore hole has a reduced cross section in comparison to the wheel valve inlet 118 and/or to a bore hole that leads to the wheel valve inlet 118. Therefore, the tire can actually be deflated slowly from the wheel valve outlet 120 to the wheel valve inlet 118 without the wheel valve 22 closing. In particular, the pressure at the wheel valve inlet 118 and/or at the actuating connector 114 holds a shut-off body 124 spaced from a valve seating 126 against the force of the spring 116. In the case of a comparatively greater drop in pressure at the wheel valve inlet 118 to below the predefined minimum pressure, air flowing back by way of the wheel valve outlet 120 is, however, not able to hold the shut-off body 124 of the wheel valve 22 spaced from the valve seating 126 against the force of the spring 116.

Figure 14:
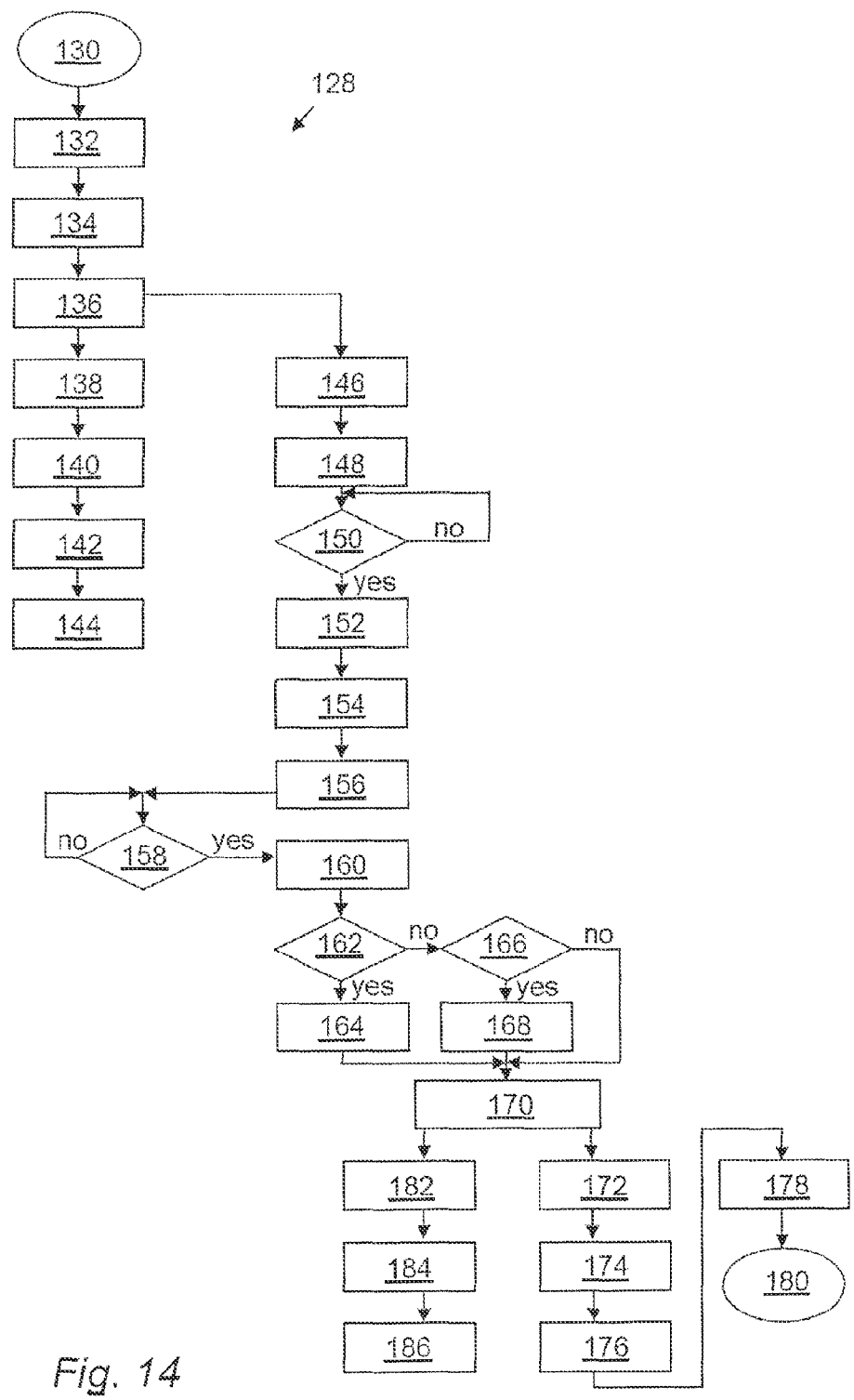
FIG. 14 is a flow chart illustrating a tire pressure changing method in accordance with an embodiment of the present invention.

FIG. 14 is a flowchart illustrating a tire pressure changing method 128 in accordance with an exemplary embodiment of the present invention. After the start 130, during which the rotary feedthrough 14 is vented and there is consequently no over-pressure at the ventilating inlet 32, at the ventilating outlet 34 and at the seal actuating outlet 36, the pressure in the tire 12 is to be changed. For this purpose, the central valve unit (see, e.g., FIG. 1) controls, for example by means of electromagnetic valves, a new tire pressure that is to be adjusted, and, in accordance with a step provides compressed air that is provided by a compressor and is at a pressure that matches the required new tire pressure. This provided compressed air is supplied by way of the compressed air duct 16 of the pressure control device 28, which, in accordance with a step 134, receives this compressed air at the ventilating inlet 32. A ventilating inlet pressure builds up at the ventilating inlet 34 due to the ventilating process in accordance with a step 136.

In response to the compressed air being received (step 134) at the ventilating inlet 32, and the ventilating inlet pressure being built up (step 136), the seal actuating outlet 36 is ventilated in accordance with a step 138 by way of the non-return valve 54 and/or by way of the one-way valve with a restrictor return 50, in particular at the most with a first volume flow. As a result, in accordance with a step 140, a seal actuating pressure builds up at the seal actuating outlet 36. Furthermore, compressed air flows by way of the seal actuating outlet 36 into the sealing ring grooves 102 and 102'. In accordance with a step 142, the seals 100 and 100' are consequently activated and/or applied at the rotor 92, thus bridging the gap 94. Consequently, the air chamber 98 is sealed in accordance with a step 144.

As air pressure is received (step 134) at the ventilating inlet 32 and the ventilating inlet pressure is built up (step 136), the switching inlet 42 of the switchover valve 38 is also ventilated. In accordance with a step 146, the restriction 46, however, delimits the volume flow to the switching inlet 42 of the switchover valve 38. In particular, at the most, a second volume flow is achieved, which is lower than the first volume flow with which the seal actuating outlet 36 is ventilated in accordance with step 138. As a consequence, the switching pressure is built up at the switching inlet 42 in accordance with a step 148 in a delayed manner in comparison to the build-up (step 140) of the seal actuating pressure. In accordance with a query 150, the switchover valve 38 remains in its blocking position as long as the switching pressure is at least less than the predefined minimum switching pressure. In accordance with a step 152, a switching of the switchover valve 38 into its through-going position is only caused by the switching pressure if at least the minimum switching pressure is exceeded by the switching pressure.

A pressure reducer can be connected upstream of the ventilating outlet 34, which reducer is controlled and ventilated by way of the switchover valve 38. But, in accordance with a step 154, the pressure reducer provides the ventilating outlet pressure that is at a pressure that is reduced and/or pressure-reduced in comparison to the ventilating outlet pressure. In a step 156, the ventilating outlet 34 is ventilated with compressed air at this ventilating outlet pressure.

Compressed air is supplied through the rotary feedthrough 14 to the actuating inlet of the wheel valve 22 by way of the ventilating outlet 34, which wheel valve, in accordance with a step 160, assumes its through-going position and/or changes from the blocking position into the through-going position as soon as, in accordance with a query 158, the pressure that is prevailing at the actuating inlet 114 is at least as high as a minimum pressure that is necessary for the switching process. As a consequence, a connection from the ventilating outlet 34 of the pressure control device 28 to the tire 12 is opened, so that the tire is inflated or deflated until the tire pressure has been adjusted to the intended new tire pressure that corresponds to the ventilating outlet pressure at the ventilating outlet 34 and/or is predefined by the ventilating inlet pressure at the ventilating inlet 32.

For this purpose, the central valve unit can operate a pressure sensor and, in dependence upon values that are sensed by this pressure sensor, supply additional compressed air to the ventilating inlet 32 of the pressure control device 28 or discharge compressed air, in order to maintain the desired ventilating inlet pressure and, consequently, finally achieve the desired tire pressure.

In particular, if, in accordance with a query 162, the ventilating outlet pressure is higher than the tire pressure and the wheel valve inlet pressure is at least as high as the minimum pressure that is required, the tire inflates in accordance with a step 164 by way of the rotary feedthrough 14. If, however, in accordance with a query 166, the ventilating outlet pressure is lower than the tire pressure and the wheel valve inlet pressure on the other hand is at least as high as the minimum pressure, the tire 12 is deflated in accordance with a step 168, in particular by way of the switchover valve 38 and the bore hole 88. If, after closing the switchover valve 38, residual pressure remains at the ventilating outlet 34, compressed air flows through the groove 89, pushes the sealing disc 85 against the force of the spring 40 away from the shut-off body 84 and flows through a gap between the shut-off body 84 and the sealing disc 85 and, subsequently, through an opening in the sealing disc, the chamber 86, the bore hole 88 and the one-way valve with a restrictor return 50 to the ventilating inlet 32.

It is possible at the central valve unit, for example, to establish that it is no longer necessary to supply compressed air to the ventilating inlet 32 of the pressure control device 28 or to discharge compressed air from this ventilating inlet 32 in order to maintain the adjusted pressure. It is recognized from this that the desired tire pressure has been set. By way of example, in response, the ventilating inlet. 32 is vented rapidly in accordance with step 170, in particular, completely, notably by way of the central valve unit. The ventilating outlet 34 is subsequently vented rapidly 172, in particular by way of the non-return valve 44. The venting process is performed rapidly and/or with a volume flow that is greater than a volume flow with which compressed air flows out of the tire 12 by way of the restriction 122 at the wheel valve 22. This has the consequence that the wheel valve inlet pressure in accordance with a step 174 drops to below the minimum pressure and the wheel valve 22 consequently assumes its blocking position in accordance with a step 176.

The tire pressure that is present in the tire 12 at this point in time is subsequently maintained in accordance with a step 178, whereas the compressed air duct 20, the compressed air duct 18, the rotary feedthrough 14, the pressure control device 28 and the compressed air duct 16 are completely vented, in particular to the surrounding air pressure. Consequently, the end 180 of a tire pressure change is achieved.

In parallel to venting (step 172) the ventilating outlet rapidly, the venting of the ventilating inlet 170 in accordance with a step 182 results in the seal actuating outlet 36 being vented in a restricted manner by way of the restriction 52 and/or by way of the one-way valve with a restrictor return 50. However, due to the restriction 52, the seal actuating outlet pressure drops slowly in comparison to the ventilating outlet pressure, so that, in accordance with a step 184, the seals 100 and 100' are released and/or deactivated slowly and/or gradually in comparison to the complete venting of the ventilating outlet 34. Therefore, in accordance with a step 186 the air chamber 98 does not open to the previously blocked parts of the gap 94 and/or to the surrounding area until the single duct rotary feedthrough 14 with the working lines 108 and 106 and with the air chamber 98 is completely vented, in particular to the surrounding air pressure.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A pressure control device for a rotary feedthrough of a vehicle tire inflating system having at least one tire that is inflatable with compressed air by way of the rotary feedthrough, the pressure control device comprising:
   a ventilating inlet configured to receive compressed air with a ventilating inlet pressure;
   a ventilating outlet configured to inflate the at least one tire with a ventilating outlet pressure by way of the rotary feedthrough;
   a seal actuating outlet configured to activate at least one seal by compressed air with a seal actuating pressure for sealing an air chamber arranged between a stator and a rotor of the rotary feedthrough;
   a switchover valve that is pneumatically switchable by a switching pressure to ventilate the ventilating outlet with the ventilating outlet pressure only when the switching pressure is at least as high as a predefined minimum switching pressure; and
   a compressed air guide configured to build up both the switching pressure and the seal actuating pressure such that the build up of the switching pressure to the predefined minimum switching pressure is delayed with respect to the build-up of the seal actuating pressure to the predefined minimum switching pressure in order to ventilate the ventilating outlet in response to build-up of the ventilating inlet pressure at the ventilating inlet at least to the predefined minimum switching pressure.

2. The pressure control device according to claim 1, further comprising a restriction, and a pressure chamber downstream of the restriction connected to a switching inlet of the switchover valve, configured to collectively delay the build-up of the switching pressure.

3. The pressure control device according to claim 1, further comprising a non-return valve for venting the ventilating outlet to the ventilating inlet.

4. The pressure control device according to claim 3, further comprising an additional non-return valve for ventilating the seal actuating outlet with, at the most, a first volume flow, and a restriction for venting the seal actuating outlet in restricted manner with, at the most, a second volume flow that is reduced compared to the first volume flow.

5. The pressure control device according to claim 1, further comprising a pressure reducer connected upstream of the ventilating outlet to provide compressed air at the ventilating outlet with a reduced ventilating outlet pressure compared to the ventilating inlet pressure at the ventilating inlet.

6. A rotary feedthrough for a vehicle tire inflating system, comprising a stator, a rotor and the pressure control device according to claim 1, wherein the pressure control device is integrated in the stator.

7. A tire inflating system for a motor vehicle having at least one tire that can be rotated together with a rotor, the tire inflating system comprising a rotary feedthrough including a stator and the rotor and the pressure control device according to claim 1.

8. The tire inflating system according to claim 7, further comprising a 2/2 directional-control wheel valve connected downstream of the rotary feedthrough and upstream of the at least one tire, the wheel valve having a restricted wheel valve outlet, and a wheel valve inlet connected to an actuating inlet of the wheel valve, wherein the wheel valve is configured to assume a through-going position when the pressure at the wheel valve inlet is at least as high as a predefined minimum pressure and assumes a blocking position when the pressure at the wheel valve inlet is lower than one of the predefined minimum pressure and a different minimum pressure.

9. The tire inflating system according to claim 7, wherein the rotary feedthrough is structurally consolidated into one unit with at least one of (i) a wheel bearing of a wheel that comprises the at least one tire and (ii) an ABS-speed sensor system allocated to the wheel.

10. A vehicle, comprising the tire inflating system according to claim 7.

11. A method for changing pressure in at least one tire of a vehicle using a vehicle tire inflating system equipped with a rotary feedthrough having a stator and a rotor, the method comprising:
receiving compressed air with a ventilating inlet pressure in a pressure control device having a ventilating inlet, a ventilating outlet, a seal actuating outlet and a switchover valve, the switchover valve being pneumatically switchable by a switching pressure by way of the ventilating inlet;
activating at least one seal by way of the seal actuating outlet by compressed air with a seal actuating pressure and sealing an air chamber between the stator and the rotor; and
inflating the at least one tire with a ventilating outlet pressure by way of the ventilating outlet and the rotary feedthrough;
wherein the ventilating outlet is ventilated with the ventilating outlet pressure by the switchover valve only when the switching pressure is at least as high as a predefined minimum switching pressure; and
wherein the ventilating inlet pressure is increased at least to the predefined minimum switching pressure at the ventilating inlet to ventilate the ventilating outlet, both the switching pressure and the seal actuating pressure are increased, and the compressed air in the pressure control device is supplied such that an increase in switching pressure to the predefined minimum switching pressure is delayed compared to an increase in the seal actuating pressure.

12. The tire pressure changing method according to claim 11, further comprising delaying the build-up of the switching pressure using a restriction and a pressure chamber downstream of the restriction connected to a switching inlet of the switchover valve.

13. The pressure changing method according to claim 11, further comprising venting the ventilating outlet to the ventilating inlet by way of a non-return valve.

14. The tire pressure changing method according to claim 13, further comprising ventilating the seal actuating outlet by way of an additional non-return valve with, at the most, a first volume flow and venting the seal actuating outlet in a restricted manner by way of a connection with a reduced cross section with, at the most, a second volume flow that is reduced compared to the first volume flow.

15. The tire pressure changing method according to claim 11, wherein the pressure reducer connected upstream of the ventilating outlet provides compressed air at the ventilating outlet with a reduced ventilating outlet pressure compared to the ventilating inlet pressure at the ventilating inlet.

16. The pressure changing method according to claim 11, wherein a 2/2 directional-control wheel valve connected downstream of the rotary feedthrough and upstream of the at least one tire and having a restricted wheel valve outlet and a wheel valve inlet connected to an actuating inlet of the wheel valve assumes a through-going position when the pressure at the wheel valve inlet is at least as high as a predefined minimum pressure, and assumes a blocking position when the pressure at the wheel valve inlet is lower than one of the predefined minimum pressure and a different minimum pressure.

17. A tire inflating system for a motor vehicle, comprising a rotary feedthrough including the pressure control device according to claim 6.

18. A vehicle, comprising the tire inflating system according to claim 17.

* * * * *